United States Patent [19]
Witte

[11] Patent Number: 4,484,794
[45] Date of Patent: * Nov. 27, 1984

[54] OPTICAL STAR COUPLER AND THE METHOD OF MAKING

[75] Inventor: Hans-Hermann Witte, Munich, Fed. Rep. of Germany

[73] Assignee: Siemens Aktiengesellschaft, Berlin & Munich, Fed. Rep. of Germany

[*] Notice: The portion of the term of this patent subsequent to May 22, 2001 has been disclaimed.

[21] Appl. No.: 298,593

[22] Filed: Sep. 2, 1981

[30] Foreign Application Priority Data

Sep. 24, 1980 [DE] Fed. Rep. of Germany ....... 3036044

[51] Int. Cl.$^3$ ............................................. G02B 5/172
[52] U.S. Cl. .................................. 350/96.16; 156/154
[58] Field of Search ............... 350/96.15, 96.16, 96.17, 350/96.18, 96.19; 156/153, 154

[56] References Cited

U.S. PATENT DOCUMENTS

| 4,184,740 | 1/1980 | d'Auria et al. | 350/96.16 |
| 4,193,661 | 3/1980 | d'Auria et al. | 350/96.16 |
| 4,199,222 | 4/1980 | Ikushima et al. | 350/96.19 |
| 4,200,356 | 4/1980 | Hawkes et al. | 350/96.16 |
| 4,213,670 | 7/1980 | Milton et al. | 350/96.16 |
| 4,243,296 | 1/1981 | Aulich et al. | 350/96.15 |
| 4,285,570 | 8/1981 | Minemura et al. | 350/96.18 |
| 4,362,357 | 12/1982 | Stockmann et al. | 350/96.16 |

FOREIGN PATENT DOCUMENTS

| 2000877 | 1/1979 | United Kingdom | 350/96.17 |
| 2005045 | 4/1979 | United Kingdom | |

OTHER PUBLICATIONS

F. Auracher et al., "Optimized Layout for Data Bus System Based on a New Planar Access Coupler", *Applied Optics*, vol. 16, No. 12, Dec. 1977, pp. 3140–3142.
G. L. Tangonan et al., "Planar Multimode Couplers for Fiber Optics", *Optics Communications*, vol. 27, No. 3, Dec. 1978, pp. 358–360.
Hudson et al., "The Star Coupler: A Unique Interconnection Component for Multi-Mode Optical Waveguide Communications Systems", *Applied Optics*, vol. 13, No. 11, Nov. 1974, pp. 2540–2545.
*Schott Informationen*, No. 4, 1978, pp. 21–22 (with translation).
M. Stockmann et al., "Planar Star Coupler for Multimode Fibers", *Applied Optics*, vol. 19, No. 15, Aug. 1980, pp. 2584–2588.
D. H. McMahon et al., "Distributive Tee Couplers", *Applied Physics Letters*, vol. 28, No. 7, Apr. 1976, pp. 396–398.
A. F. Milton et al., "Star and Access Couplers for Multichannel Fiber Cables", *IEEE J. Quantum Electron*, vol. QE-13, No. 9, (9/1977), p. 21D.

*Primary Examiner*—John Lee
*Attorney, Agent, or Firm*—Hill, Van Santen, Steadman & Simpson

[57] ABSTRACT

An optical star coupler for use in optical systems with multi-mode optical fibers for interconnecting two groups of system fibers, characterized by the star coupler comprising a mixing element, two groups of optical fiber elements and an arrangement for positioning the mixing element and the groups of fiber elements in the same plane. The mixing element is a planar waveguide which has an input and output end which are interconnected to groups of the fiber elements with a packing density of each group of the fiber elements at the input and output ends being as high as possible. The planar waveguide has a thickness approximately equal to the diameter of the fiber elements and the diameter of each of the fiber elements is approximately equal to the core diameter of the system fiber to which it is connected and all of the fiber elements are selected to be of one type of fiber which are either gradient fibers or stepped profile fibers. To position the mixing element and the group of fiber elements in the same plane, a method includes forming a sandwich of the mixing element between a cover and substrate, forming a pair of sandwiches for each group of fiber elements between a substrate and a cover element, assembling these sandwiches on a support element with the polished end surfaces of the fiber element sandwiches engaging the polished end surfaces of the mixing element sandwich, and securing the sandwiches in the assembled position.

8 Claims, 5 Drawing Figures

OPTICAL STAR COUPLER AND THE METHOD OF MAKING

BACKGROUND OF THE INVENTION

The present invention is directed to an optical star coupler for multi-mode optical fibers in which two bundles of optical fiber elements are connected to the input and output surfaces of a mixer element formed by a planar waveguide having a thickness which is approximately equal to the diameter of the fiber elements. The mixer element and the two bundles of fiber elements are disposed in the same plane with the fiber elements lying in a single layer with as maximum a packing density as possible and the fiber elements having a diameter which is approximately equal to the core diameter of the system fibers which are to be connected to the coupler.

For optical broad band communication, optical components are required which distribute the power of any one of the n incoming channels to n outgoing channels. For $n>2$, these components are called star couplers. These couplers are intended to have as low as possible insertion losses and are to distribute the power as uniformly as possible over the n outgoing channels independent of the type of excitation. For a broad band - x - length - product greater than several 10 MHz xkm, the gradient fibers are the only transmission medium considered for the multi-mode fibers that act as a transmission medium.

Different structures for star couplers are known. For example, the star coupler can have a mixing zone which can consist either of fused together fibers, of tapered and fused together fibers, of a planar waveguide cladded fiber band or of a planar non-cladded glass plate such as disclosed in the U.S. patent application Ser. No. 136,423 filed Apr. 2, 1980, which issued as U.S. Pat. No. 4,362,357 and was based on German Pat. No. P 29 15 114.2. For the manufacture of the mixing zone consisting of fused together fibers, the cladding of the fibers in the mixing region must be removed prior to the step of fusing together. Due to the coupling mechanism, mixer zones consisting of fused together fibers or tapered and fused together fibers are predominantly suitable for only fibers having a stepped profile. These mixers basically couple out in a mode dependent fashion whereby in the case of gradient fibers, this mode dependency has a particular disadvantageous effect. This mode dependency has a consequence that the light in the incoming fibers is not uniformly distributed over n outgoing fibers. By increasing the length of the coupling region, the uniformity of the power distribution will be improved. However, with the longer coupling region, the losses are also simultaneously increased. Moreover it is difficult to manufacture the cited mixer as a sturdy component. An embedding of the fibers in a cement in order to achieve a good, mechanical strength creates problems because in the mixer region, the light reaches the cement and the losses are therefore further increased. Thus, when the coupler, which is disclosed in the above mentioned copending application, is utilized with a gradient system without special measures, it will have high insertion losses or insufficient division of the power equally between the outgoing fibers.

SUMMARY OF THE INVENTION

The present invention is directed to providing a star coupler utilizing a planar waveguide as the mixing element which coupler when utilized in a communication system with gradient profile fibers has low insertion losses, and a good distribution of the power to the outgoing fibers.

To accomplish these goals, the present invention is directed to an optical star coupler for use in an optical system with multimode optical fibers for interconnecting two groups of system fibers, said optical star coupler comprising a mixing element; two groups of optical fiber elements; and means for positioning the mixing element and said groups of fiber elements in the same plane, said mixing element being a planar waveguide having input and output ends which are interconnected to the two groups of fiber elements with the packing density of each group of the fiber elements at the input and output end being as high as possible, said planar waveguide having a thickness approximately equal to the diameter of the fiber elements, the diameter of each of the fiber elements being approximately equal to the core diameters of the system fiber to which it is connected and all of the fiber elements being of one type selected from a group of gradient fibers and stepped profile fibers. Advantageously, the cladding of the optical fibers are to be as thin as possible.

Fluctuations of 100% in the cladding thickness of these optical fibers forming the fiber elements however will have virtually no influence. On the contrary it is more important to select overall diameter of the optical fiber elements to be equal to the core diameter of the system gradient fibers. The thickness of the mixer plate or element is made approximately equal to the diameter of the optical fiber elements of the star coupler.

Preferably the mixing element, which comprises a planar waveguide, is interposed between a first substrate and a cover to form a first sandwich, and each of the groups of the fiber elements are mounted on a substrate and covered by a cover element or plate to form a second and third sandwich respectively with the fibers between the cover and substrates. The substrates of the three sandwiches have the same thickness and the sandwiches are mounted on a common substrate or supporting element with the mixing element of the two groups of fiber elements in the same plane to form the means for positioning the mixing elements and fibers in the same plane.

The star coupler of the present invention can be manufactured by the methods which are described in the above mentioned U.S. patent application Ser. No. 136,423 and also by the methods disclosed in the co-pending U.S. patent application Ser. No. 240,870, which was filed on Mar. 5, 1981 and the disclosures of the two applications are incorporated by reference thereto. In addition, the star coupler of the present invention can also be advantageously manufactured in accordance with a method, which includes the steps of providing the mixing element having polished surfaces except for the two end surfaces and having a desired thickness, mounting the mixing element on the first substrate with an optical cement, mounting the cover on the other surface to form a first sandwich with the mixing element formed by the planar waveguide being interposed between the first substrate and the cover, polishing the end faces of the sandwich, fixing each of the groups of the fiber elements on a separate substrate having a thickness corresponding to the thickness of the substrate for the first sandwich with the fiber elements being in a single layer, covering each of the groups of the fiber elements of the cover plate to form a second and third sandwich with each sandwich having a layer of fiber elements disposed between a cover and substrate, polishing the ends of each of the second and third sandwiches, providing a common support, positioning the three sandwiches on said common support with the first sandwich being disposed between the second and third sandwiches and the polished end surfaces of the second and third sandwiches engaging the polished end surfaces of the first sandwich and then securing said sandwiches in said position. If desired, a common cover can also be secured over the three sandwiches which are secured on the common support. Preferably, the thickness of the optical cement utilized for mounting the mixing element on the first substrate is approximately 2 μm.

DESCRIPTION OF THE PREFERRED EMBODIMENTS

Figure 1A:
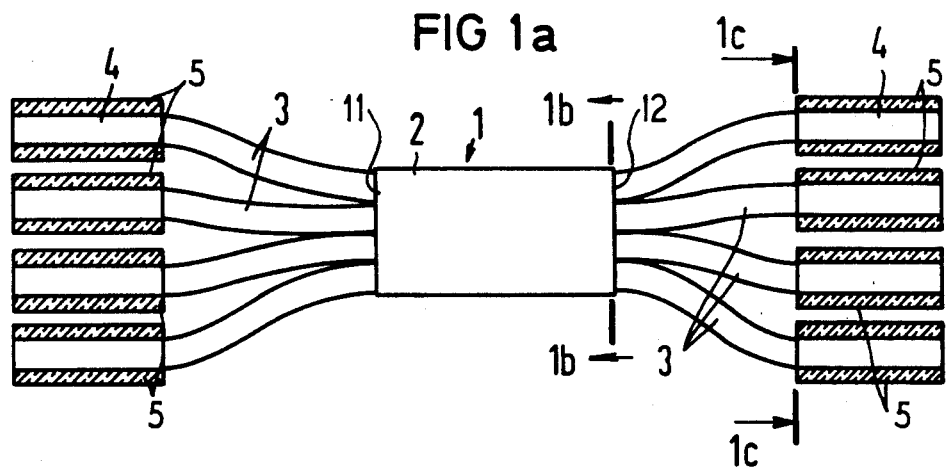
FIGS. 1a–1e various views of an optical coupler in accordance with the present invention with FIG. 1a being a plan view with portions in cross-section of the optical coupler of the present invention interconnecting two groups of system fibers, FIG. 1b being a view taken along line 1b—1b of FIG. 1a, FIG. 1c being a cross-section taken along the lines 1c—1c, FIG. 1d being an end view of a sandwich containing the fiber elements, and FIG. 1e being an end view of a sandwich containing the mixing element.
Figure 1B:
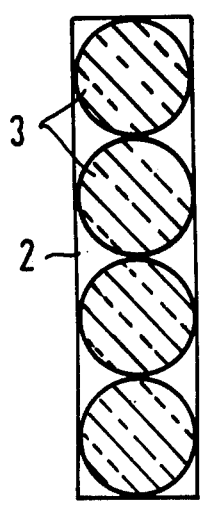

The principles of the present invention are particularly useful in an optical star coupler generally indicated at 1 in FIG. 1a. The optical star coupler 1 comprises a planar light waveguide 2 as the mixing element which has an input end surface 11 and output surface 12. The coupler 1 also includes two groups of optical fiber elements 3 with one group being abutted against the end face 11 of the planar light waveguide and the other group being abutted against the output end face 12. The thickness of the mixer element 2 corresponds to the diameter of the optical fiber elements 3. The system fibers 4 of the optical system are if necessary coupled to the optical fiber elements 3. As best illustrated in FIG. 1b a section through the star coupler shows the thickness of the mixer element 2 corresponds to the overall diameter of the optical fiber elements 3 and that the fiber elements 3 are arranged as a single layer to lie in a plane which is coplanar with the waveguide 2.

Figure 1C:
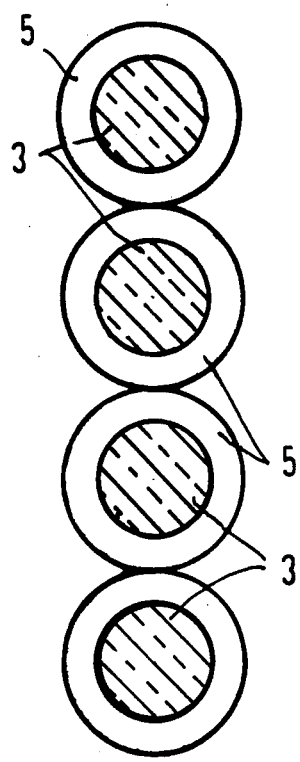

As best illustrated in FIGS. 1a and 1c, each of the system fibers 4 has a cladding 5. FIG. 1c clearly shows that the optical fiber element 3 has an overall diameter which is equal to the core diameter of the system fibers 4 which are gradient fibers. As illustrated, the cladding of the system fibers 4 lies completely outside of the cross-section of the optical fiber elements 3 so that the overall diameter of the optical fiber elements 3 coincides with the core diameter of the system fibers 4. For a star coupler 1 according to the present invention, an optical fiber element 3 can either be a fiber with a stepped profile or a fiber with a gradient profile. In both instances in any case, the system fibers 4 are gradient fibers. In order to keep the losses low in both instances, the cladding of the optical fiber elements 3 should be as thin as possible and preferably $\leq 5$ μm. With a cladding thickness in this range of less than 5 μm, a fluctuation of 100% in the cladding thickness will have virtually no influence.

Since the star coupler 1 is employed in a system with gradient fibers in comparison with the system having stepped index fibers, additional losses of approximately 2–3 dB will occur. Because the mixer element 2 corresponds to a waveguide with a stepped profile, during the distribution of the light an unavoidable junction or transmission from a stepped profile to a gradient profile will occur. Experimentally a 2×32 gate star coupler was investigated. Since the core diameter of the system gradient fiber amounted to 65 μm with a cladding thickness of approximately 7 μm, the overall diameter of the fiber elements 3 are selected to be 65 μm. The mixer plate thickness likewise amounted to approximately 65 μm. An insertion loss of approximately 4 dB was measured for this coupler. This loss relates to the entire power of the 32 output-gradient system fibers relative to the power in the input gradient system fibers. The fluctuation of the powers in all output-system fibers results at plus or minus 0.5 dB. Power distribution and insertion loss turn out to be virtually equal and are independent of whether the optical fiber elements 3 have a stepped profile or a gradient profile. In the case of the utilization of stepped profile elements at the end face of the mixing element 2, a transition from a stepped profile to a stepped profile planar waveguide 2 takes place. If the optical fiber elements 3 are gradient profile optical fibers, the advantage of this arrangement consists in that the same optical fiber type is employed for both the elements 3 and fibers 4 and thus fewer mismatches in the mode types of the respective optical fibers will occur. If the profile optical fibers are employed as the optical fiber elements 3, the coupler has an advantage which is that the technology for the manufacture of the fibers with a thin cladding is simpler for stepped profile fibers than it is for gradient profile fibers.

Figure 1D:
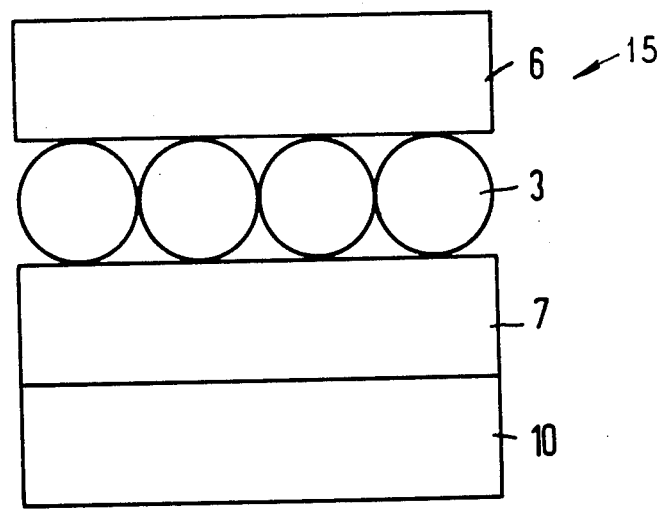
Figure 1E:
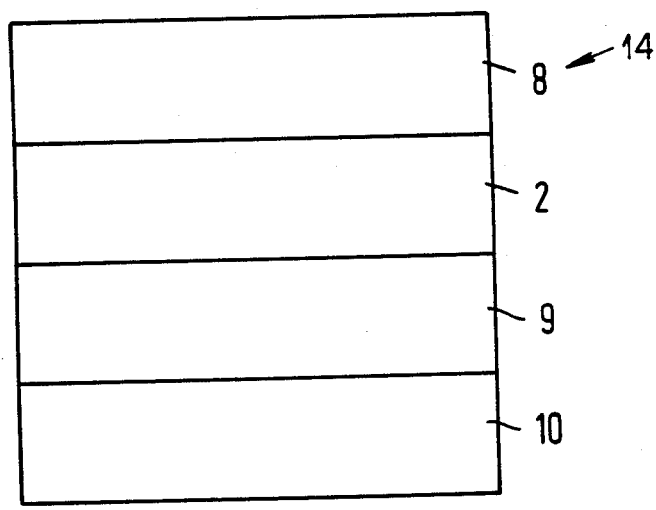

The manufacturing of the star coupler according to the present invention can proceed as mentioned in the above two U.S. patent applications. In addition, the star coupler can be produced in the following manner. A mixing plate 2 of the desired thickness is polished on all surfaces except the two end surfaces or faces. This plate 2 is then mounted by use of an optical cement between a substrate 9 and a cover 8 to form a first sandwich generally indicated at 14 (FIG. 1e). The substrate 9 and the cover 8 are selected to be of a material which advantageously has approximately equal expansion coefficients as the material forming the mixing element 2 and have an index of refraction which is not higher than the material of the mixing element 2. The cement, which is between the substrate 9 and the mixer element 2, has a thickness which amounts to approximately 2 μm. The end faces of the sandwich 14 are now polished so that the end faces of the mixing element 2 as well as the substrates 9 and 8 are polished together.

The row of the fiber elements 3 is manufactured by the fiber elements 3 being fixed on a substrate 7 while in lateral contact with each other in a layer having a single thickness. The substrate 7 has a thickness which corresponds to the thickness of the substrate 9. After securing the group of fiber elements on the substrate 7, a cover such as cover plate 6 is placed over the fiber elements 3 to form a closure and to form a second sandwich structure generally indicated at 15 (FIG. 1d). After securing the fibers between the substrates 7 and the plates 6 to form the substrate 15, the end surfaces of the substrate are polished which includes polishing both the end surfaces of the optical fiber elements 3 as well as the end surfaces of the subtrate 7 and the cover 6. In a similar manner the other group of the optical fiber elements 3 are secured in a sandwich so that there are two sandwiches identical to sandwich 15.

The next step of the method after the end faces of the two sandwiches 15 have been finished as well as the two end faces of the sandwich 14, the three sandwiches are placed on a common support or substrate 10 and positioned with the polished end faces of each of the sandwiches such as 15 engaging a polished end face of the sandwich 14. After securing the three sandwiches in this position, the method can include securing a common cover on the three sandwiches or units. The step of securing the cover only requires the precaution that the mixer end faces cover the fiber rows. In view of the above described method, the three sandwiches all lie on the same plane and due to utilizing the desired optical elements 3, a minimum coupling loss is guaranteed.

As mentioned hereinabove, the cladding thickness of the optical fiber elements 3 are to be as thin as possible. Such optical fibers can be manufactured from any of the following methods. One of these methods is to deposit the cladding on an optical fiber core. This can be accomplished by a chemical vapor deposition (CVD) method with the external depositions which method will deposit and subsequently form a cladding of a homogenous material of a desired thickness on the core of the fiber.

A second possible method is to provide a fiber having a cladding and then to chemically etch the cladding of the fiber to the desired thickness. Another method involves a chemical vapor deposition method (CVD) with internal deposition of a material with a gradient index profile to form a preform. The preform is subsequently collapsed and ground to the desired cladding thickness prior to being drawn into a fiber.

If the fiber elements are to have a stepped profile with a thin cladding, it can be easily manufactured by utilizing a double crucible method. The size of the openings in the crucible for the cladding or jacket of the fiber will be adjusted to provide the desired thickness for the cladding.

Although various minor modifications may be suggested by those versed in the art, it should be understood that I wish to embody within the scope of the patent granted hereon, all such modifications as reasonably and properly come within the scope of my contribution to the art.

I claim:

1. An optical star coupler for use in an optical system with multimode optical fibers for interconnecting two groups of system fibers, said optical star coupler comprising a mixing element; two groups of optical fiber elements; and means for positioning the mixing element and said groups of fiber elements in the same plane, said mixing element being a planar waveguide having an input end and an output end which ends are interconnected to the groups of fiber elements with a packing density of each group of the fiber elements at the input and output ends being as high as possible, said planar waveguide having a thickness equal to the diameter of each of the fiber elements, the diameter of each of the fiber elements being equal to the core diameter of the system fiber to which it is connected and all of the fiber elements being of one type selected from a group consisting of gradient fibers and step profile fibers.

2. An optical star coupler according to claim 1, wherein the cladding of each of the fiber elements is as thin as possible.

3. An optical star coupler according to claim 1, wherein all of the fiber elements are stepped profile fibers having a cladding as thin as possible.

4. An optical star coupler according to claim 1, wherein all of the fiber elements are gradient fibers.

5. An optical star coupler according to claim 1, wherein the mixing element comprises a planar waveguide interposed between a first substrate and a cover, each of the groups of fiber elements being mounted on a substrate and covered by a cover element to form a sandwich with the fiber elements between the cover and substrate, said substrates for the fiber elements and the first substrate for the planar waveguide being of the same thickness, and wherein the means for positioning includes a common substrate supporting each of the substrates with the mixing element and two groups of fiber elements in the same plane.

6. A method for manufacturing an optical star coupler having a mixing element consisting of a planar waveguide with an input end and an output end, a group of optical coupler fiber elements being interconnected to the input end and a second group of fiber elements being connected to the output end, each of said groups being disposed to lie in the plane of the mixing element with the highest packing density as possible and each of the fiber elements having a diameter approximately equal to the thickness of the planar waveguide, said method comprising the steps of providing a mixing element having polished surfaces except for the two end faces and having a desired thickness, mounting the mixing element on a first substrate with an optical cement, mounting a cover on an exposed surface of the mixing element to form a first sandwich, polishing the end faces of the sandwich, fixing each of the groups of fiber elements on a separate substrate having a thickness corresponding to the thickness of the substrate for the mixing element with the fiber elements being in a single layer, covering each of the groups of fiber elements with a cover plate to form a second and third sandwich with each sandwich having a layer of optical fiber elements disposed between a cover and a substrate, polishing the ends of each of the second and third sandwiches, providing a common support, positioning the three sandwiches on said common support in a position with the first sandwich being disposed between the second and third sandwiches and with the polished end surfaces of the second and third sandwiches engaged with the polished end surfaces of the first sandwich and securing said sandwiches in said position on said common support.

7. A method according to claim 6, wherein the cement thickness between the first substrate and the mixing element formed by a planar waveguide amounts to approximately 2 $\mu$m.

8. A method according to claim 6, which includes securing a common cover over the three sandwiches secured on the common support.

* * * * *